F. V. FOLLAND.
CHUCK.
APPLICATION FILED DEC. 26, 1917.
1,282,061.
Patented Oct. 22, 1918.
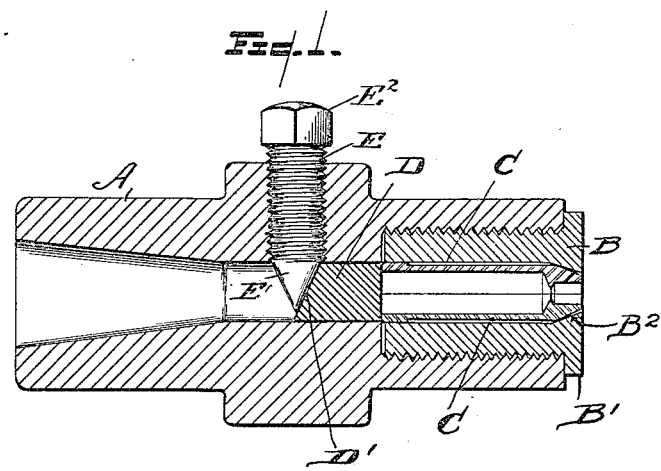
Inventor
Frederick V. Folland
By S. E. Thomas
Attorney

UNITED STATES PATENT OFFICE.

FREDERICK V. FOLLAND, OF WINDSOR, ONTARIO, CANADA.

CHUCK.

1,282,061.

Specification of Letters Patent.

Patented Oct. 22, 1918.

Application filed December 26, 1917. Serial No. 208,988.

*To all whom it may concern:*

Be it known that I, FREDERICK V. FOLLAND, a British subject, residing at Windsor, county of Essex, Province of Ontario, Canada, have invented a certain new and useful Improvement in Chucks, and declare the following to be a full, clear, and exact description of the same, such as will enable others skilled in the art to which it pertains to make and use the same, reference being had to the accompanying drawings, which form a part of this specification.

My invention relates to chucks shown in the accompanying drawings and more particularly pointed out in the following specification and claims.

One of the objects of this invention is to provide a chuck of inexpensive construction which may be quickly adjusted to either grip or release the rod or tool supported thereby.

With the foregoing and other objects in view which will appear as the description proceeds, the invention resides in the combination and arrangement of parts and in the details of construction hereinafter described and claimed, it being understood that changes may be made in the precise embodiment of the invention herein disclosed without departing from the spirit of the same.

In the accompanying drawings forming part of this specification:

Figure 1 is a longitudinal central sectional view through the chuck.

Fig. 2 is an end elevation of the same.

Referring now to the letters of reference spread upon the drawings.

A, denotes the body of the chuck, B, denotes an annular collar screwed into the body portion A, having a flange B', overlapping the end of the body portion, and provided with an inclined inner wall or nose piece $B^2$. C, denotes a plurality of clamping jaws or collet, having a tapering peripheral outer end adapted to be acted upon by the inclined inner wall or nose piece of the annular collar B, that the jaws of the collet may be forced together to grip a tool or rod. D, indicates a collet tightener or follower supported in the body portion A, and bearing against the end of the collet. E, indicates an adjustable screw supported in the wall of the body portion having a tapering end E', adapted to bear against the inclined end D', of the collet follower D. $E^2$, denotes a squared head on the end of the screw to facilitate adjustment.

Having indicated the several parts by reference letters the construction and operation of the chuck will be readily understood. A rod or tool shank (not shown) is first placed between the jaws of the collet;—the screw E, is then adjusted that its tapering end may bear against the follower D, to force the collet into contact with the inclined wall or nose piece of the annular collar B, whereby the jaws of the collet are tilted to grip the rod or tool inserted therein.

Having thus described my invention what I claim is:

1. In a device of the character described, a body portion, an annular collar supported in the body portion having a tapering inner wall at one end of the collar, a collet comprising a plurality of jaws housed in said collar, a follower supported in the body portion back of the collet having an inclined face, and an adjustable screw supported in the wall of the body portion having a tapering end adapted to bear against the inclined wall of the follower.

2. In a device of the character described, a body portion, an annular collar screwed into the end of the body portion with a flange overlapping the end of the latter and a tapering inner wall adjacent to the outer end of the collar, a collet comprising a plurality of jaws having an inclined end adapted to be acted upon by the tapering wall of the collar, a wedge-shaped follower housed in the body portion back of the collet, and an adjustable screw supported in the body portion having a tapering end adapted to bear against the inclined wall of the follower.

In testimony whereof, I sign this specification in the presence of two witnesses.

FREDERICK V. FOLLAND.

Witnesses:
S. E. THOMAS,
EDWIN R. MONNIG.

Copies of this patent may be obtained for five cents each, by addressing the "Commissioner of Patents. Washington, D. C."